United States Patent Office 3,804,823
Patented Apr. 16, 1974

3,804,823
HETEROCYCLIC CONTAINING MONOAZO COMPOUNDS
John G. Fisher and Gary T. Clark, Kingsport, Tenn., assignors to Eastman Kodak Company, Rochester, N.Y.
No Drawing. Filed Feb. 15, 1972, Ser. No. 226,552
Int. Cl. C09b 29/36
U.S. Cl. 260—158
10 Claims

ABSTRACT OF THE DISCLOSURE

Compounds of the formula:

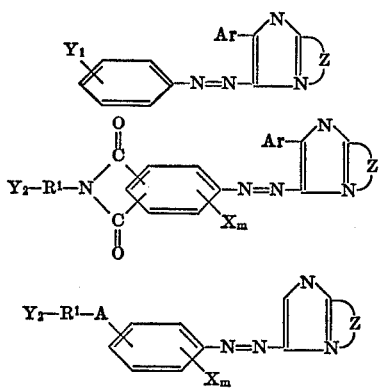

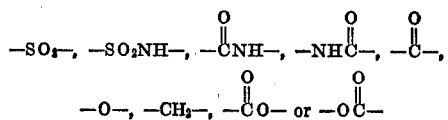

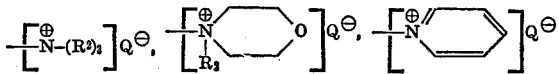

wherein
$R^1$ represents alkylene;
A represents

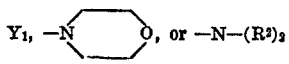

$Y_1$ represents $$-\left[\overset{\oplus}{N}-(R^2)_3\right]Q^\ominus, \; -\left[\overset{\oplus}{\underset{R^2}{N}}\diagup O\right]Q^\ominus, \; -\left[\overset{\oplus}{N}\diagup\diagdown\right]Q^\ominus$$

or $$-\left[\overset{\oplus}{\underset{R^2}{N}}\diagup\diagdown\right]Q^\ominus$$

$Y_2$ represents $$Y_1, \; -N\diagup O, \; \text{or} \; -N-(R^2)_2$$

$R^2$ represents alkyl;
X represents hydrogen, halogen, alkyl, cyano, nitro, alkylsulfonyl, alkoxycarbonyl or hydroxy;
$m$ represents 1 or 2;
Q represents a basic dye anion;
Ar represents an unsubstituted or substituted carbocyclic acyl group; and
Z represents the atoms necessary to complete a five or six membered heterocyclic ring.

The monoazo compounds are useful as dyes for hydrophobic textile materials, such as polyester and cellulose acetate. The cationic monoazo compounds are useful as dyes for acrylic, modacrylic and acid-modified polyester textile materials.

---

This invention relates to certain novel monoazo compounds useful as dyes for hydrophobic textile materials, such as polyester and cellulose acetate, and to novel cationic monoazo compounds useful as dyes for acrylic, modacrylic and acid-modified polyester textile materials.

The novel compounds of the invention have the general formula:

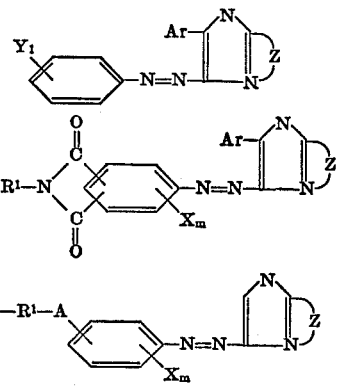

(I)

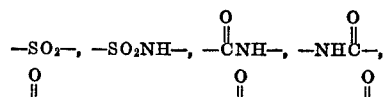

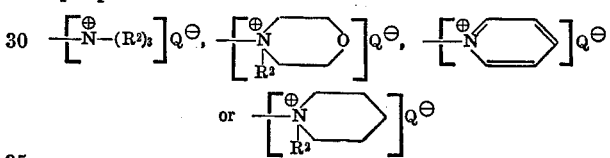

wherein
$R^1$ represents lower alkylene;
R represents

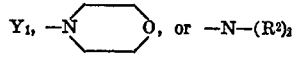

$Y_1$ represents $$-\left[\overset{\oplus}{N}-(R^2)_3\right]Q^\ominus, \; -\left[\overset{\oplus}{\underset{R^2}{N}}\diagup O\right]Q^\ominus, \; -\left[\overset{\oplus}{N}\diagup\diagdown\right]Q^\ominus$$

or $$-\left[\overset{\oplus}{\underset{R^2}{N}}\diagup\diagdown\right]Q^\ominus$$

$Y_2$ represents $$Y_1, \; -N\diagup O, \; \text{or} \; -N-(R^2)_2$$

$R^2$ represents lower alkyl;
X represents hydrogen, halogen, lower alkyl, cyano, nitro, lower alkylsulfonyl, lower alkoxycarbonyl or hydroxy;
$m$ represents 1 or 2;
Q represents a basic dye anion;
Ar represents an unsubstituted or substituted carbocyclic aryl group; and
Z represents the remainder of a heterocyclic ring system which completes a 5 or 6 membered ring with the carbon and nitrogen atoms to which Z is bonded, the ring atoms of Z consisting of carbon, or carbon and at least one nitrogen, sulfur or oxygen atom.

The unquaternized compounds of the invention, i.e., when $Y_2$ is defined as

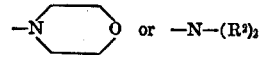

have excellent affinity for hydrophobic textile materials such as polyester, cellulose acetate and polyamide fibers in shades of yellow or orange. The cations of the invention, i.e., when $Y_1$ or $Y_2$ is

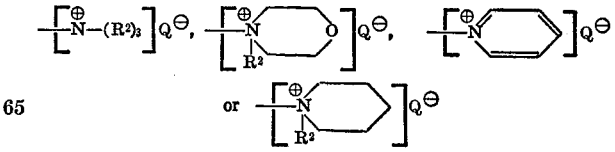

have excellent affinity for acrylic, modacrylic and acid-modified textile materials and when applied thereto by conventional means, display excellent properties, such as for example, excellent fastness to light and wet processing as well as perspiration fastness.

Examples of the lower alkylene groups which may be represented by R¹ are methylene, ethylene, propylene, isopropylene, butylene, etc. Examples of the lower alkyl, lower alkylsulfonyl, lower alkoxy, lower alkoxycarbonyl or halo groups represented by X include methyl, ethyl, propyl, isobutyl, isopropyl, butyl, methoxy, ethoxy, propoxy, bromo, chloro, fluoro, methylsulfonyl, ethylsulfonyl, propylsulfonyl, butylsulfonyl, methoxycarbonyl, ethoxycarbonyl, propoxycarbonyl, butoxycarbonyl, etc.

The carbocyclic aryl groups represented by Ar can be unsubstituted or substituted with lower alkyl, lower alkoxy, halogen, nitro, cyano, etc. Specific examples of such phenyl groups include but are not limited to phenyl, p-tolyl, m-ethylphenyl, p-anisyl, p-chlorophenyl, o-bromo-p-tolyl, o,p-dichlorophenyl, p-cyanophenyl.

The carbon atoms of the unsaturated, divalent groups represented by Z can be substituted or unsubstituted. Examples of the ring atoms that Z can represent include

—S—C=C—, —C=C—C=C—, —C=C—N=C—,

—O—C=N—, —S—C=N—, —N=C—C=N—,

—N=C—C=C—, —O—C=C—N. The carbon atoms of the divalent groups represented by Z can be substituted with various substituents including a fused carbocyclic ring which may also be substituted. Examples of such substituents are hydrogen, lower alkyl, lower alkoxy, halogen, lower alkylsulfonyl, thiocyanato, alkylthio, etc. As used herein to describe a substituent containing an alkyl moiety, the word "lower" designates a carbon content of up to about four carbon atoms. Typical of the groups represented by the divalent chain Z include the following groups

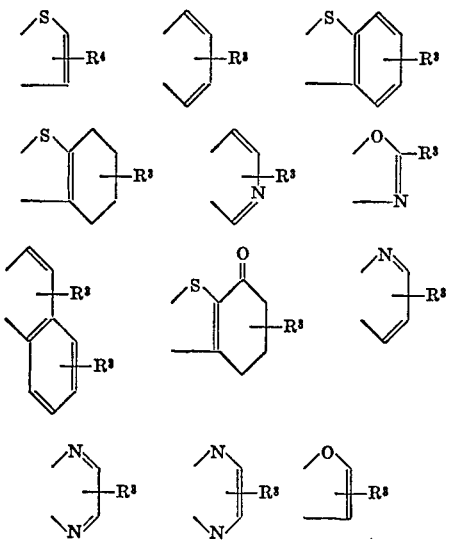

wherein R³ represents hydrogen or one or more substituents described above. Preferably, R³ represents not more than two substituents.

A particularly preferred group of the compounds of the invention are those containing a diazo component having the formula:

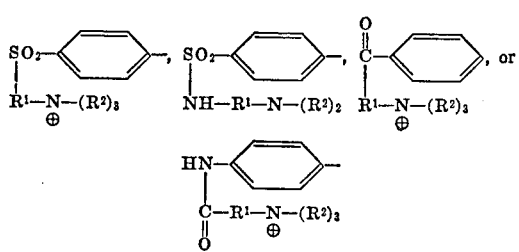

A preferred group of the coupler components of the novel compounds of the invention have the formula

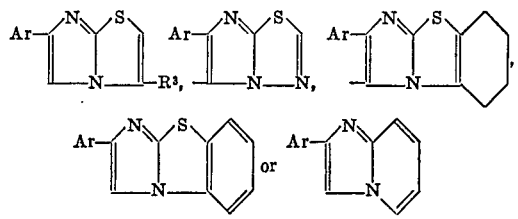

wherein Ar represents phenyl or phenyl substituted with lower alkyl; and R³ represents hydrogen and lower alkyl. Especially preferred are the coupler components conforming to the above structure to which R³ is attached.

The monoazo compounds of the invention are prepared by diazotizing an amine having the formula:

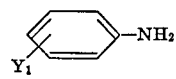

(II)

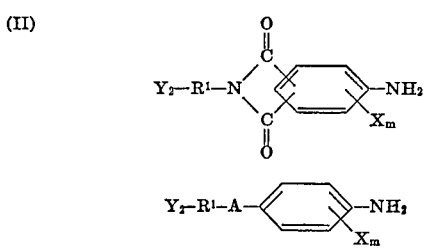

and coupling the resulting diazonium salt with a compound having the formula (III)

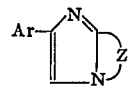

wherein R¹, A, Y₁, Y₂, X, m, Ar and Z are defined above. The amines of Formula II and the coupling procedures that can be used are well known in the art of dye chemistry.

The couplers of Formula III are prepared by methods, or methods analogous to those described in the literature, e.g., see also U.S. Ser. No. 661,215. The reaction by which the couplers are prepared is illustrated by the following equation:

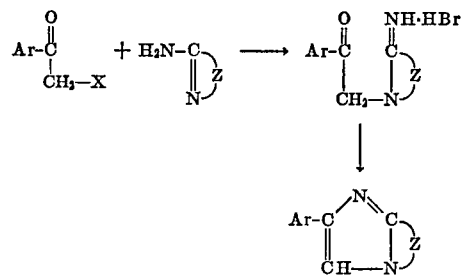

In addition to the examples below, the preparation of the couplers used for preparing the novel compounds of the invention are also described in A. Chem. 2, 153 (1962); C.A., 58, 453g; Ber., 95, 1128 (1962); Ber., 60, 1607 (1927); and J. Pharm. Soc. Japan, 57, 1050 (1937); C.A., 32, 33,985.

The novel cationic compounds of the invention are prepared by treating the monoazo compounds described above with an alkylating agent at elevated temperature with or without an inert solvent. Suitable alkylating agents that can be used are the dialkyl sulfates, the alkyl halides, the aralkyl halides, the alkyl esters of aryl sulfonic acids, etc. Examples of such alkylating agents include dimethyl sulfate, diethyl sulfate, dipropyl sulfate, ethyl bromide, methyl iodide, ethyl iodide, benzyl chloride, benzyl bromide, methyl p-toluene sulfonate and ethyl benzenesulfonate.

Examples of the basic dye anions represented by Q include Cl⁻, Br⁻, I⁻, CH₃SO₄⁻, C₆H₅SO₃⁻, etc., the anion depending upon the method of isolation utilized and the particular quaternizing agent employed. The anion does not affect the utility of the cations of the invention as dyes nor does it affect the dye affinity of the cations for polyacrylonitrile textile materials. When the compounds are used to dye polyacrylonitrile textile material, the anion becomes associated with a positively charged ion derived from the polyacrylonitrile and is removed from the dye cation and polyacrylonitrile textile material, either in the dyebath or in a subsequent washing of the dyed polyacrylonitrile textile material. As is well known in the art, the cation of a cationic azo dye is responsible for the color of the compound and the particular anion associated with the cation is not important.

As is well known in the art of dye chemistry, the primary color of the compounds of the invention is attributable to the conjugation of the compounds as shown in Formula I. For this reason, the groups represented by $X_m$, Ar and Z, as these groups are defined herein, are not important with respect to the usefulness of the compounds as dyes for the described textile materials. The groups represented by $X_m$, Ar and Z and their substituents, if any, that are present on these groups function primarily as auxochrome groups to vary the color of the compounds and cations.

The unquaternized and quaternized compounds of this invention and their preparation are further illustrated by the following examples.

PREPARATION OF THE COUPLERS

Example 1.—6,6-dimethyl-8-keto-2-phenyl-5,6,7,8-tetrahydroimidazo[2,1-b]benzothiazole A 0.08 m. quantity each of 2-amino-5,5-dimethyl-7-keto - 4,5,6,7 - tetrahydrobenzothiazole and α-bromoacetophenone are mixed in 150 ml. of chloroform and heated at reflux for 4 hours. The slurry is filtered hot and the insoluble intermediate product is suspended in 600 ml. of water containing 25 g. of sodium acetate. This suspension is heated slowly to boil over 2½ hours, then allowed to cool. The product is filtered off, washed well with water and dried yielding 12.5 g. of product melting at 175–178° C. and having the structure:

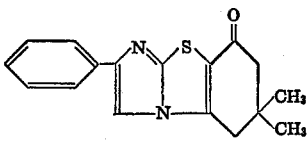

Example 2.—2-phenylimidazo[1,2-a]pyrimidine

An equimolar mixture of 2-aminopyrimidine and α-bromoacetophenone are heated in absolute ethanol for several hours at 60–70° C. Anhydrous ether is added to precipitate the hydrobromide of the product. The free base, melting at 202° C., is obtained by the action of aqueous Na₂CO₃ solution and has the formula

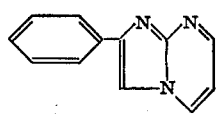

Example 3.—7-methyl-2-phenylimidazo[1,2-c]pyrimidine

Substitution of 4-amino-6-methylpyrimidine yields a coupler which melts at 244° C. and has the structure:

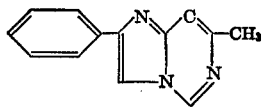

Example 4.—2-phenylimidazo[2,1-b]benzothiazole

A 0.2 m. quantity each of 2-aminobenzothiazole and α-bromoacetophenone are mixed in 350 ml. of chloroform and heated at reflux for 1½ hours. After cooling, the solid intermediate product is filtered off and slurried in 2 l. of water containing 10 ml. of 48% hydrobromic acid. This is then heated to a boil, filtered hot, and after allowing to cool the filtrate is basified with NH₄OH to yield 6.8 g. of 2-phenylimidazo[2,1-b]benzothiazole melting at 108–10° C. and having the formula:

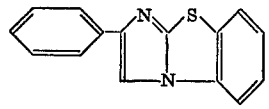

Example 5.—2-phenylimidazo[1,2-a]pyridine 0.1 m. quantities of 2-aminopyridine and α-bromoacetophenone are heated in 150 ml. of chloroform at reflux for 2 hours. The chloroform is evaporated and the oily residue taken up in 10% HCl, warmed, charcoal added and filtered. The filtrate is neutralized with NH₄OH and the solid product isolated and recrystallized from ethanol. The yield of product is 12.7 g., melts at 135–137° C. and has the structure:

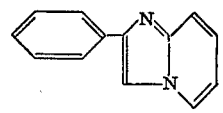

Example 6.—2-phenyl-5,6,7,8-tetrahydroimidazo-[2,1-b]benzothiazole 0.1 m. quantities of 2-amino-4,5,6,7-tetrahydrobenzothiazole and α-bromoacetophenone in 100 ml. of chloroform are heated at reflux for 2 hours. After cooling, the solid is filtered off and slurried in 1 l. of water containing 40 g. of ammonium acetate. This suspension is heated to boiling over a 2-hour period and allowed to cool. The product is collected, washed with water and dried. The yield of product is 19.8 g. melting at 158–160° C. and having the formula:

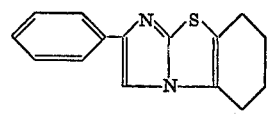

Example 7.—6-phenylimidazo[2,1-b]-1,3,4-thiadiazole 10.1 g. of 2-amino-1,3,4-thiadiazole is dissolved in 160 ml. of ethanol, 19.9 g. of α-bromoacetophenone is added and the solution is heated and stirred at reflux for 1 hour. After cooling, the solid is filtered off and dissolved in 750 ml. of water and 40 ml. of 48% hydrobromic acid. This solution is heated at reflux for 1 hour, neutralized by addition of solid ammonium acetate and refluxed ½ hour longer. After cooling, the product is collected on a filter, washed with water and dried. The yield of product is 13 g. melting at 127–130° C. It has the formula:

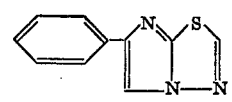

Example 8.—6-phenylimidazo[2,1-b]thiazole

Bromine (21.5 ml.) is added to a solution of 50 g. of acetophenone and 0.1 g. of anhydrous AlCl₃ in 200 ml. of chlorobenzene. The addition requires about 20 minutes and the temperature of the reaction solution rises to about 35° C. Dry air is bubbled through the solution until all the gaseous HBr is removed. 2-aminothiazole (24 g.) is added and the reaction mixture stirred and heated on a steam bath for 1 hour. The thick reaction mixture is filtered while still hot and the filter cake washed with hexane. The dry product is slurried in 200 ml. of methanol and then diluted with a solution of 80 g. ammonium acetate in 1600 ml. of water. This suspension is stirred and heated to 80° C., then filtered and the product thus obtained is washed with 4 l. of water. The yield is 70 g. of product which melts at 143–144° C. and has the structure:

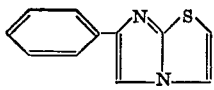

Additional couplers can be prepared by employing techniques either published in the literature or analogous to those described in the preceding examples.

PREPARATION OF THE MONOAZO COMPOUNDS

Example 9a

To 30 ml. of 1–5 acid [one part propionic acid to five parts acetic acid] a solution of 2.16 g. (0.03 mole) of sodium nitrite in 15 ml. of conc. $H_2SO_4$ is added portionwise at a temperature below 20° C. The solution is cooled and 7.9 g. (0.03 mole) of p-[β-(diethylaminoethyl)sulfonyl] aniline is added at a temperature below 5° C. and then 30 ml. of 1–5 acid is added below 5° C. After stirring at 0–5° C. for 3 hr., the diazotization is complete. The diazo solution is added at a temperature below 10° C. to an externally cooled solution of 1.0 g. (0.005 mole) of 6-phenylimidazo[2,1-b]thiazole in 20 ml. of 1–5 acid. The mixture is neutralized with solid $NH_4OAS$ to Congo red paper. After coupling is complete, the reaction is drowned into ice water and made basic with conc. $NH_4OH$. The dye is collected by filtration, washed with water and air-dried.

Example 9b

One gram of the dye from Example 9a is heated in 5 ml. of dimethyl sulfate on the steam bath for 20 min. The solution is drowned in 150 ml. of ether and the ether is decanted. The residue is dissolved in water and reprecipitated after filtering by addition of KI. The resultant quaternary iodide imparts fast yellow shades to acrylic fibers. This dye has the following structure:

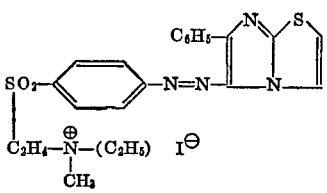

Example 10a

To a solution of 4.36 g. (0.015 m.) 2-chloro-4-N-[γ-(dimethylaminopropyl)sulfonamido]aniline in 9 ml. of conc. HCl and 30 ml. of water, a solution of 1.08 g. (0.015 m.) of $NaNO_2$ in 10 ml. of water is added below 5° C. After stirring at −5–0° C. for 2 hr. the diazotization is complete. The diazo solution is added below 10° C. to a solution of 1.0 g. (0.005 m.) of 6-phenylimidazo[2,1-b]thiazole in 20 ml. of 1–5 acid[propionicacetic]. The solution is neutralized to Congo red paper with solid $NH_4OAC$. After coupling is complete, the reaction is drowned in 200 ml. of ice water and then made basic with conc. $NH_4OH$. The dye is collected by filtration, washed with water and air-dried.

Example 10b

One gram of the dye from Example 10a is heated in 3 ml. of dimethylformamide and 2 ml. of dimethyl sulfate on the steam bath for one hour. The reaction is drowned in 20 ml. of water and heated on steam bath for 30 min., filtered and the dye is reprecipitated with KI. The resultant quaternary iodide imparts fast orange shades to acrylic fibers. This dye has the following structure:

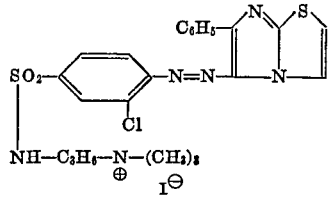

The dyes in the following examples are prepared in a manner similar to that described in the previous examples.

Example 11a

A solution of 3.94 g. (0.015 m.) of p-[dimethylaminoacetamido]aniline dihydrochloride in 4.5 ml. of conc. HCl and 15 ml. of water is diazotized and coupled with 6-phenylimidazo[2,1-b]thiazole as described in Example 10a. The dye is also isolated as described in Example 10a.

Example 11b

One gram of the dye from Example 11a is quaternized as described in Example 10b. The resultant quaternary iodide imparts fast yellow shades to acrylic fibers. This dye has the following structure:

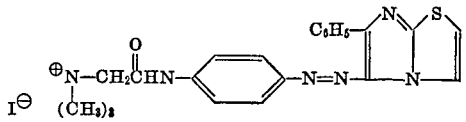

Example 12a

A solution of 3.12 g. (0.015 m.) of p-[γ-diethylaminopropoxy]aniline in 4.5 ml. of conc. HCl and 15 ml. of water is diazotized and coupled with 6-phenylimidazo [2,1-b]thiazole as described in Example 10a. The resulting dye is also isolated in the same manner as described in Example 10a.

Example 12b

One gram of the dye from Example 12a is quaternized as described in Example 10b. The resultant quaternary salt imparts fast yellow shades to acrylic fibers. This dye has the following structure:

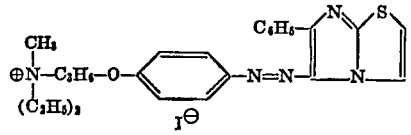

Example 13

Five grams of 2-bromo-4[β-diethylaminoethylsulfonyl] aniline is diazotized and coupled with 6-phenylimidazo [2,1-b]thiazole as described in Example 9a. The resulting dye is isolated in the same manner as described in Example 9a. This dye imparts fast orange shades from an acid dye bath on acid modified polyester and acrylics. This dye has the following structure:

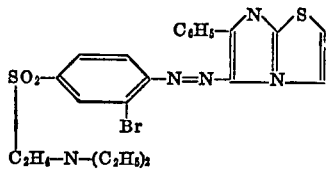

Example 14

A dye having the following structure is prepared and isolated in the same manner as described in Example 9a.

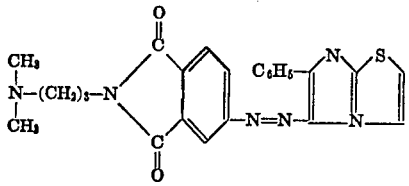

Example 15

A solution of 8.11 g. (0.03 mole) trimethylammonium-4'-acetamidoacetophenone chloride in 9 ml. of conc. HCl and 30 ml. of water is heated on a steam bath for 1.5 hours. The solution is cooled and diazotized and coupled with 6-phenylimidazo[2,1-b]benzothiazole as described in Example 10a. After coupling is completed, the reaction product is poured into water, collected by filtration and air-dried. This dye imparts a yellowish-orange shade on acrylic fibers. This dye has the following structure:

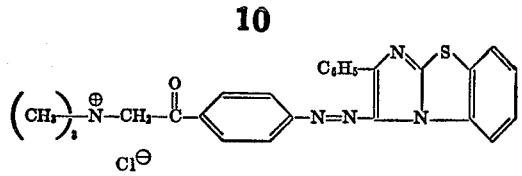

Examples 16–33

The azo compounds set forth below are prepared according to the procedures described above or by known techniques analogous to those procedures. The colors given for the following examples of the compounds of the invention refer to polyester fibers dyed with these compounds:

TABLE I

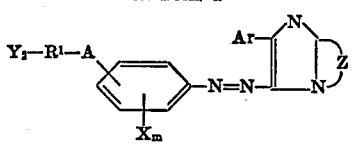

| Example | Y₂ | R₁ | A | Xₘ | Ar | Z | Color |
|---|---|---|---|---|---|---|---|
| 16 | —N—(C₂H₅)₂ | ⟨CH₂⟩₂ | 4-SO₂— | 2,6-dibromo | C₆H₅ | S–CH=CH– | Orange. |
| 17 | —N—(CH₃)₂ | ⟨CH₂⟩₂ | 4-SO₂NH— | H | C₆H₅ | Same as above | Yellow. |
| 18 | —N—(CH₃)₂ | ⟨CH₂⟩₂ | 4-SO₂NH— | 2,6-bromo | C₆H₅ | do | Orange. |
| 19 | —N—(CH₃)₂ | ⟨CH₂⟩₂ | 4-CONH— | H | C₆H₅ | do | Yellow. |
| 20 | —N—(CH₃)₂ | ⟨CH₂⟩₂ | 3-SO₂NH— | H | C₆H₅ | do | Do. |
| 21 | —N—(C₂H₅)₂ | —CH₂— | 4-CH₂— | H | C₆H₅ | do | Do. |
| 22 | —N—(CH₃)₃ | ⟨CH₂⟩₂ | 4-SO₂NH | 2-NO₂ | C₆H₅ | do | Do. |
| 23 | —N—(C₂H₅)₂ | ⟨CH₂⟩₂ | 4-SO₂— | H | C₆H₅ |  | Do. |
| 24 | —N—(CH₃)₂ | —CH₂— | 4-NHCO— | H | C₆H₅ | 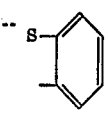 | Do. |
| 25 | [—N—(CH₃)₃]⁺ I⁻ | —CH₂— | 4-CO— | H | C₆H₅ | 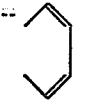 | Orange. |
| 26 | —N—(C₂H₅)₂ | ⟨CH₂⟩₂ | 4-SO₂— | H | C₆H₅ | 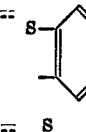 | Yellow. |
| 27 | —N—(C₂H₅)₂ | ⟨CH₂⟩ | 4-SO₂— | H | C₆H₅ | 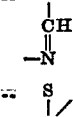 | Do. |
| 28 | —N—(C₂H₅)₂ | ⟨CH₂⟩₂ | 4-SO₂— | H | C₆H₅ | 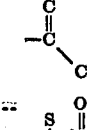 | Do. |
| 29 | —N—(C₂H₅)₂ | ⟨CH₂⟩₂ | 4-SO₂— | H | 4-Br-C₆H₄ | 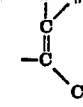 | Do. |
| 30 | —N—(C₂H₅)₂ | ⟨CH₂⟩₂ | 4-SO₂— | H | {4,5-dihydroxy C₆H₃} | Same as above | Do. |
| 31 | —N—(C₂H₅)₂ | ⟨CH₂⟩₂ | 4-SO₂— | H | {4-dimethylamino C₆H₄} | do | Do. |
| 32 | —N—(CH₃)₂ | —CH₂—CH—CH₃ | 4-SO₂— | H | C₆H₅ | do | Do. |
| 33 | —N—(CH₃)₂ | —CH₂—CH—CH₃ | 4-SO₂— | 2-Cl | C₆H₅ | do | Orange. |

Examples 34-39

The azo compounds set forth below are prepared according to the procedures described above or by known techniques analogous to those procedures. The colors given for the following examples of the cations of the invention refer to acrylic fibers dyed with these cations.

Example 40

An amount of 0.1 g. of the dye is dissolved in the dye pot by warming in 5 cc. of 2-methoxy ethanol. About 3-5 cc. of a 3% sodium lignin sulfonate aqueous solution is added, with stirring, until a fine emulsion is obtained. Water is then slowly added to a total volume of 300 cc.

TABLE II

| Example | Compound | Color |
|---|---|---|
| 34 | [structure] | Yellow. |
| 35 | [structure] | Do. |
| 36 | [structure] | Do. |
| 37 | [structure] | Do. |
| 38 | [structure] | Do. |
| 39 | [structure] | Do. |

The monoazo compounds of the invention can be used for dyeing hydrophobic fibers such as linear polyester, cellulose ester, polyamide, etc., fibers in the manner described in U.S. Pats. 2,880,050; 2,757,064; 2,782,187; and 3,043,827.

The following example illustrates one method by which the compounds of the invention can be used to dye polyester textile materials.

Then, 3 cc. of an emulsifiable nonionic, modified biphenyl derivative carrier (Carolid: Tanatex Chemical Corp.) are added and 10 grams of a textile fabric made of poly (ethylene terephthalate) fibers are entered. The fabric is worked 10 minutes without heat and then for 10 minutes at 80° C. The dye bath is then brought to the boil and held at the boil for one hour. Following this, the fabric is rinsed in warm water, then scoured in aqueous 0.2% soap, 0.2% soda ash solution. After scouring, the fabric is rinsed with water and dried.

When the compounds of the invention are used to dye polyamide textile materials, the above procedure can be employed except the Carolid dyeing assistant need not be used. When cellulose acetate fibers are dyed with the compounds, the above procedure can be followed omitting the Carolid dyeing assistant and carrying out the dyeing at 80° C. for one hour rather than at the boil.

The compounds of the invention can also be applied to polyester textile materials by the heat fixation technique of dyeing. This procedure is described in U.S. Pat. 2,663,-612 and in the American Dyestuff Reporter, 42, 1 (1953).

Polymeric linear polyester materials of the terephthalate type are illustrative of the linear aromatic polyester textile materials that can be dyed with the compounds of our invention. Examples of linear polyester textile materials that can be dyed with the compounds of the invention are those prepared from ethylene glycol and dimethylterephthalate) polyester fibers are described, for example, ylterephthalate. Polyesters prepared from cyclohexanedimethanol and dimethylterephthalate are more particularly described in U.S. Pat. 2,901,446. Poly(ethylene terephthalene) polyester fibers are described, for example, in U.S. Pat. 2,465,319. The polymeric linear polyester materials disclosed in U.S. Pats. 2,945,010, 2,957,745 and 2,989,363, for example, can be dyed. The linear aromatic polyester materials specifically named have a melting point of at least 200° C. and are sold under the trade names "Kodel," "Dacron" and "Terylene."

Examples of the polyamide fibers that can be dyed with the compounds of the invention are those consisting of nylon 66, made by the polymerization of adipic acid and hexamethylenediamine, nylon 6, prepared from epsilon-aminocaproic acid lactam, and nylon 8. The cellulose acetate fibers that can be dyed with the compounds of the invention include fibers consisting of either cellulose triacetate or partially hydrolyzed cellulose acetate.

The cationic monoazo compounds of the invention can be used for dyeing acrylic and modacrylic polymer fibers, yarns and fabrics a broad range of shades. Acrylic textile materials are those which consist of at least 85% acrylonitrile and modacrylic textile materials are those consisting of at least 35% but less than 85% acrylonitrile. The cationic compounds of the invention also give excellent dyeings on acid-modified acrylic textile materials such as the sulfonate modified acrylic fibers described in U.S. Pats. 2,837,500; 2,837,501 and 3,043,811. The novel cationic compounds can also be used to dye sulfonate modified polyester fibers such as are described in U.S. Pat. 3,018,272. Examples of the textile materials that are dyed with the cationic compounds of the invention are those sold under the trade names "Orlon," "Orlon 42," "Verel," "Acrilan," "Dynel," "Creslan" and "Dacron 64." In general, the cationic compounds when used as dyes on the described textile materials, exhibit improved fastness, for example, to washing, to alkaline perspiration, gas (atmospheric fumes) and sublimation.

Textile materials dyed by the cationic compounds of the invention are characterized by containing at least about 35% combined acrylonitrile units and up to about 95% acrylonitrile units, and modified, for example, by 65-5% of vinyl pyridine units as described in U.S. Pats, 2,990,393 (Re. 25,533) and 3,014,008 (Re. 25,539) or modified by 65-5% of vinylpyrrolidone units, for example, as described by U.S. Pat. 2,970,783, or modified with 65-5% acrylic ester or acrylamide units as described in U.S. Pats. 2,879,253; 2,879,254 and 2,838,470. Similar amounts of the other polymeric modifiers mentioned above are also useful. A preferred group of the copolymers readily dyeable with the dyes of the invention are the modacrylic polymers such as described in U.S. Pat. 2,831,826 composed of a mixture of (A) 70–95% by weight of a copolymer of from 30 to 65% by weight of vinylidene chloride or vinyl chloride and 70–35% by weight of acrylonitrile, and (B) 30–5% by weight of a second polymer from the group consisting of (1) homopolymers of acrylamidic monomers of the formula

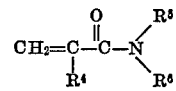

wherein $R^4$ is selected from the group consisting of hydrogen and methyl, and $R^5$ and $R^6$ are selected from the group consisting of hydrogen and alkyl groups of 1–6 carbon atoms, (2) copolymers consisting of at least two of said acrylamidic monomers, and (3) copolymers consisting of at least 50% by weight of at least one of said acrylamidic monomers and not more than 50% by weight of polymerizable monovinyl pyridine monomer.

Another type of modacrylic polymer than can be dyed with the cationic compounds of the invention is an acetone soluble mixture of (A) 70–95% by weight of a copolymer of 30–65% by weight of vinylidene chloride and 70–35% by weight of acrylonitrile and (B) 30–5% by weight of an acrylamide homopolymer having the above formula wherein $R^{11}$, $R^{12}$ and $R^{13}$ are as described above. Specific polymers of that type contain 70–95% by weight of (A) a copolymer of from 30–65% by weight of vinylidene chloride and 70–35% by weight of acrylonitrile and (B) 30–5% by weight of a lower N-alkylacrylamide polymer such as poly-N-methacrylamide, poly-N-isopropylacrylamide and poly-N-tertiarybutylacrylamide.

The following example illustrates one way in which the cationic compounds of the invention can be used to dye acrylonitrile polymer textile material.

Example 41

An amount of 0.1 gram of dye is dissolved by warming in 5 cc. of 2-methoxyethanol. A 2% aqueous solution of a nonionic surfactant, such as Igepal CA (a polymerized ethylene oxide-alkylphenol condensation product), is added slowly until a fine emulsion is obtained and then the dye mixture is brought to a volume of 200 cc. with warm water. Five cc. of a 5% aqueous solution of formic acid or acetic acid are added and then 10 grams of fabric made from an acrylic fiber is entered and, in the case of "Orlon 42" acrylic textile material, the dyeing is carried out at the boil for one hour. In the case of materials made of "Verel" modacrylic fiber the dyebath temperature should not exceed 90° C. in order to avoid damage to the fiber. The dyed material is then washed well with water and dried.

Although this invention has been described in detail with particular reference to preferred embodiments thereof, it will be understood that variations and modifications can be effected within the spirit and scope of the invention.

We claim:
1. A compound of the formula

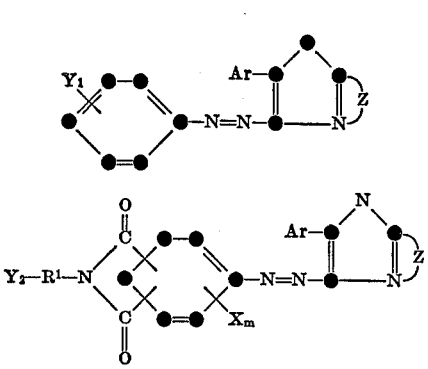

or

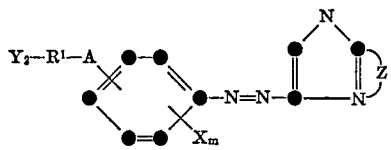

wherein

R¹ represents lower alkylene;
A represents

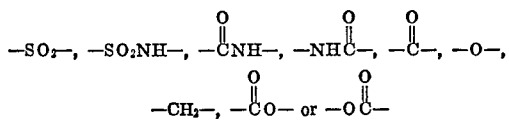

Y₁ represents

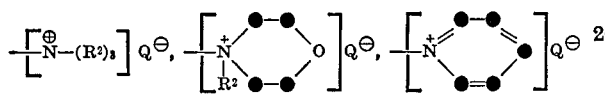

or

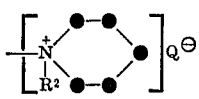

Y₂ represents

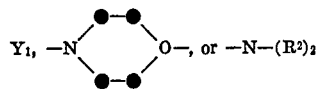

R² represents lower alkyl;
X represents hydrogen, halogen, lower alkyl, cyano, nitro, lower alkylsulfonyl, lower alkoxy, lower alkoxycarbonyl or hydroxy;
m represents 1 or 2;
Q represents a basic dye anion;
Ar represents phenyl or phenyl substituted by lower alkyl, lower alkoxy, halogen, hydroxy or diloweralkylamino; and
Z represents a group having the fromula

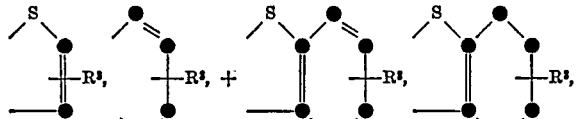
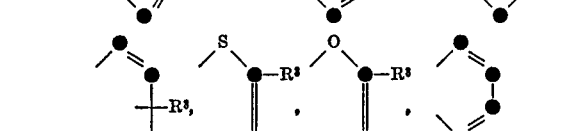
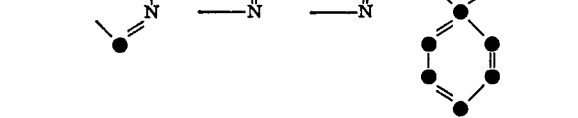
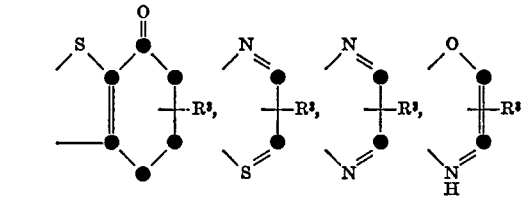

wherein R³ represents hydrogen or lower alkyl.

2. Compound according to claim 1 wherein A represents

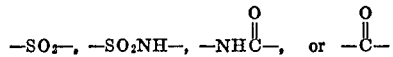

Y₁ and Y₂ each represents

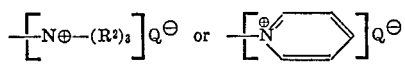

and
X represents hydrogen, halogen, cyano, or nitro.

3. Compound according to claim 2 wherein Z represents

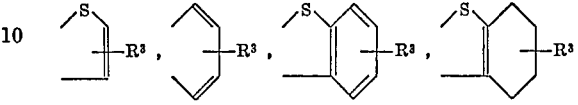

or

wherein R³ represents hydrogen and lower alkyl.

4. Compound according to claim 3 wherein
m represent 1;
Ar represents phenyl or phenyl substituted with lower alkyl;
Z represents

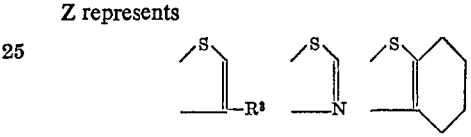

wherein R³ represents hydrogen and lower alkyl.

5. Compounds according to claim 4 wherein Z represents

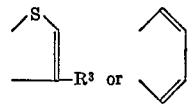

wherein R³ represents hydrogen and lower alkyl.

6. Compound according to claim 1 having the formula

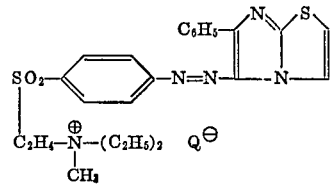

7. Compound according to claim 1 having the formula

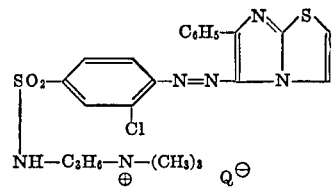

8. Compound according to claim 1 having the formula

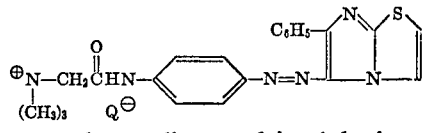

9. Compound according to claim 1 having the formula

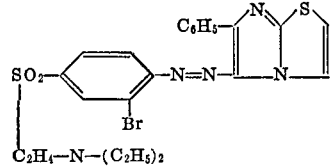

10. Compound according to claim 1 having the formula
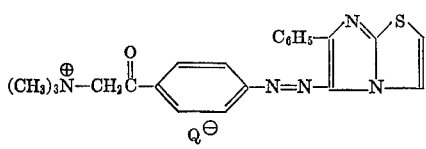
References Cited
UNITED STATES PATENTS
3,316,238  4/1967  Hanke et al. _____ 260—152 X
FOREIGN PATENTS
427,092  12/1966  Switzerland _____ 260—156
OTHER REFERENCES
Straley et al.: Def. Pub. of Ser. No. 663,484, filed Aug. 28, 1967, pub. in 857 O.G. 43 on Dec. 3, 1968, Def. Pub. T857,010.
Chem. Abs., vol. 66, 1967, 11,837s.
LEWIS GOTTS, Primary Examiner
C. F. WARREN, Assistant Examiner
U.S. Cl. X. R.
8—41 A, 41 C; 260—146 R, 146 D, 146 T, 147, 152, 153, 154, 156, 157, 162, 163, 243 R, 244 R, 247.5 R, 248 AS, 256.4 F, 281, 296 A, 296 H, 305, 306.8 F, 307 G, 326 N

UNITED STATES PATENT OFFICE
CERTIFICATE OF CORRECTION

Patent No. 3,804,823　　　　　　　　　　Dated April 16, 1974

Inventor(s) John G. Fisher, Gary T. Clark

It is certified that error appears in the above-identified patent and that said Letters Patent are hereby corrected as shown below:

Claim 1, column 14, lines 60-67, delete the formulas

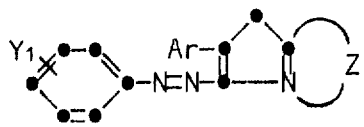

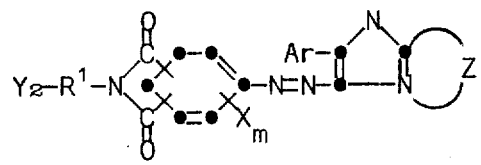

and insert in lieu thereof the following

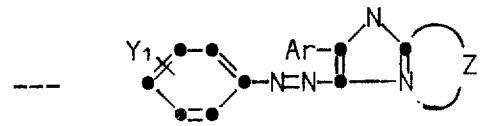

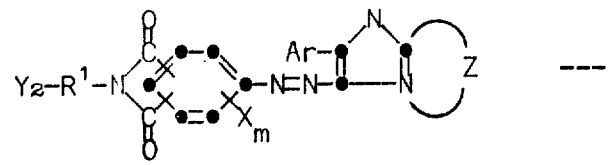

UNITED STATES PATENT OFFICE
CERTIFICATE OF CORRECTION

Patent No. 3,804,823      Dated April 16, 1974

Inventor(s) John G. Fisher, Gary T. Clark

It is certified that error appears in the above-identified patent and that said Letters Patent are hereby corrected as shown below:

- 2 -

Claim 1, column 15, lines 45-60, delete the formulas

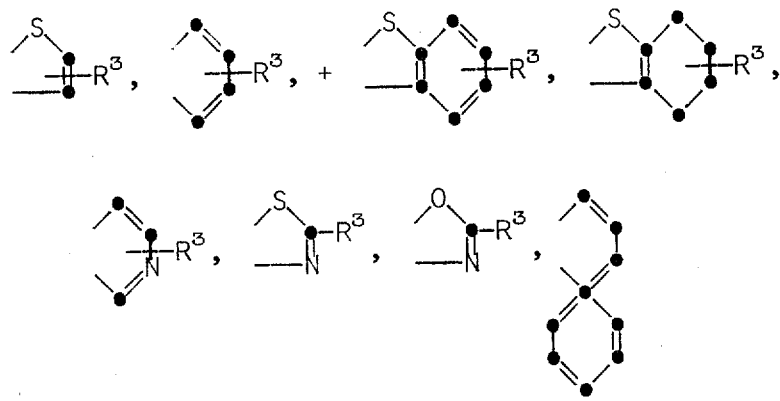

and insert in lieu thereof

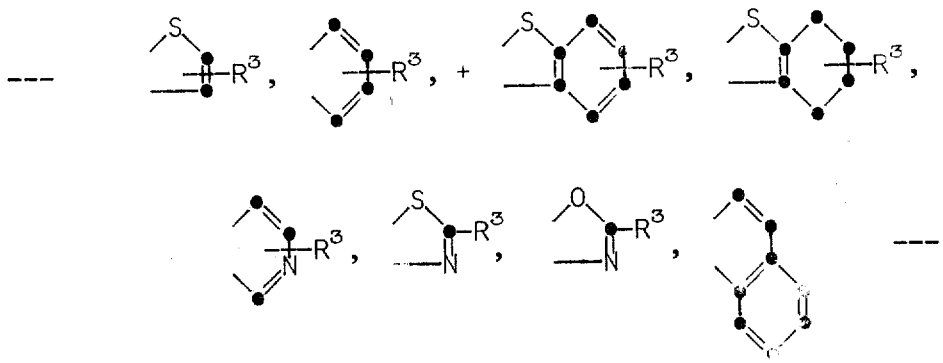

Signed and sealed this 29th day of October 1974.

(SEAL)
Attest:

McCOY M. GIBSON JR.
Attesting Officer

C. MARSHALL DANN
Commissioner of Patents